United States Patent [19]

Fujioka

[11] Patent Number: 4,725,978
[45] Date of Patent: Feb. 16, 1988

[54] GRAPHIC PATTERN INPUTTING APPARATUS

[76] Inventor: Ichiro Fujioka, 922, Hachigasaki, Matsudo-shi, Chiba-ken, Japan

[21] Appl. No.: 614,781

[22] Filed: May 29, 1984

[30] Foreign Application Priority Data

May 30, 1983 [JP] Japan .................................. 58-95184
Jul. 8, 1983 [JP] Japan .................................. 58-124442
Sep. 28, 1983 [JP] Japan .................................. 58-180033

[51] Int. Cl.$^4$ ............................................. G06F 3/03
[52] U.S. Cl. ...................................... 364/900; 178/18; 364/520
[58] Field of Search ... 364/200 MS File, 900 MS File, 364/709, 518, 520, 521; 340/707–710; 33/1 M; 346/143, 146; 178/18; 74/471 XY; 273/148 B; 901/9, 10, 33, 34

[56] References Cited

U.S. PATENT DOCUMENTS

| 3,544,972 | 12/1970 | Trousdale | 364/900 |
| 3,651,508 | 3/1972 | Scarborough | 340/707 |
| 3,763,479 | 10/1973 | Jebb et al. | 364/900 |
| 4,062,648 | 12/1977 | Hennessee | 364/520 X |
| 4,205,391 | 5/1980 | Ulyanov et al. | 364/900 |
| 4,564,928 | 1/1986 | Glenn et al. | 178/18 X |
| 4,580,006 | 4/1986 | Hull | 178/18 |
| 4,588,348 | 5/1986 | Beni et al. | 901/9 X |

Primary Examiner—Raulfe B. Zache
Assistant Examiner—Florin Munteanu
Attorney, Agent, or Firm—Spencer & Frank

[57] ABSTRACT

A graphic pattern inputting apparatus composed of: a manually actuable inputting device mounted for movement parallel to a selected plane for producing sensor signals representative of the direction, parallel to the plane, and magnitude of manual force applied to the inputting device; a drive device operatively associated with the inputting device and responsive to control signals for moving the inputting device parallel to the selected plane; and a processing unit connected between the inputting device and the drive device for performing arithmetic operations on the sensor signals for producing control signals which are a function of the sensor signals, and for supplying the control signals to the drive device.

15 Claims, 11 Drawing Figures

GRAPHIC PATTERN INPUTTING APPARATUS

BACKGROUND OF THE INVENTION

Field of the Invention

This invention relates to a graphic pattern inputting apparatus which is capable of inputting a desired graphic pattern or characters by moving an inputting tool by hand.

Keyboards or joysticks are used for the purpose of inputting graphic patterns and/or alphanumeric letters and for purpose of displaying such patterns on cathode-ray tubes or sheets of paper with X-Y plotters and other display apparatuses. For instance, a keybutton which is swingable in four directions, that is, above, below, left and right is used to input graphic patterns. The keybutton is easy to operate in inputting vertical or horizontal straight lines, but the keybutton is difficult to handle in inputting slant lines or curves. Particularly in case of inputting freedrawings the keybutton must be very often switched in direction when the chasing line extends to trace a given freedrawing. The frequent switching is inconvenient, and the drawing thus drawn often lacks definition. In contrast to the keybutton, a joystick is easy to draw slant lines or curves. The joystick is designed to be handled with a single hand rather than fingers, and therefore the joystick can not draw as smooth lines as a finger-operating tool could. A tablet or mouse is convenient for freedrawing, but is difficult to handle in drawing straight lines. Also, this tool has a poor definition.

As for the inputting operation with swingable keybuttons, an operator feels something strange because of disagreement between the direction in which a keybutton is moved and the direction in which a bright spot moves to draw a line on a CRT. The swingable keybutton and other input tools are insensitive to the strength of a force with which a hand performs inputting operation as required because these instruments are designed to detect only the two actions, that is, touching "on" and touching "off". Stated otherwise, the operator's intention or mind work cannot reflect on the resultant action in a smooth and natural way, and in this connection there is a great problem from the angle of human engineering.

As for the operation of inputting alphanumeric letters of Japanese "kana" or "hiragana", it suffices that a keybutton slotted to a desired letter is pushed, but if an operator wants to select a desired typeface among different ones, he must perform extra operations for the purpose. As for he must perform extra operations for the purpose. As for inputting "kanji" (Chinese characters) an operator must select and input alphabetical letters or "kana" to phonetically express a desired "kanji", and then he must perform extra operations for converting the phonetic expression to the desired "kanji".

SUMMARY OF THE INVENTION

One object of this invention is to provide a graphic pattern inputting apparatus which is capable of inputting easily two essentially different kinds of graphic representations, that is, straight-line structures such as freedrawings, without losing any details.

Another object of this invention is to provide a graphic pattern inputting apparatus which is capable of inputting graphics without any disagreement between the direction in which an inputting tool is moved and the direction in which a bright spot moves to draw a desired graphic on a CRT and the like, thus assuring an operator of the natural feeling of directionality.

Still another object of this invention is to provide a graphic pattern inputting apparatus which is responsive to the pressure which is applied to an inputting tool for selectively changing graphic inputting modes from one to another.

Still another object of this invention is to provide a graphic pattern inputting apparatus which is capable of rotating an associated coordinate system.

Still another object of this invention is to provide a graphic pattern inputting apparatus which is capable of detecting the writing tool pressure and the drawing direction.

DETAILED DESCRIPTION OF THE PREFERRED EMBODIMENT

Figure 1:
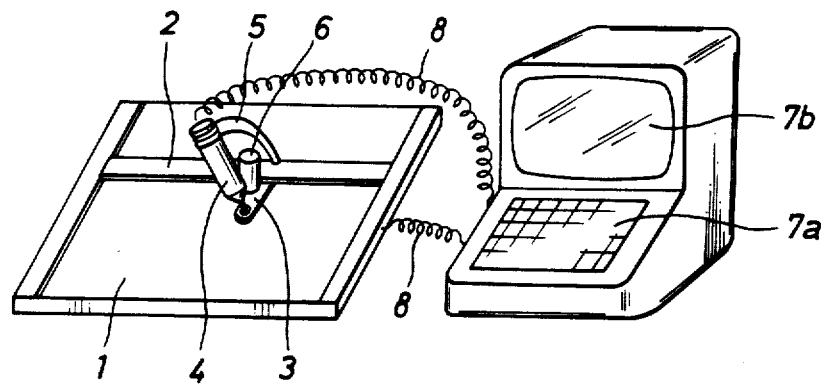
FIG. 1 is a diagrammatic perspective view of a graphic pattern inputting apparatus according to one embodiment of this invention.

FIG. 1 shows a graphic inputting apparatus according to this invention in which a desired graphic pattern to be inputted is drawn for instance on a sheet of white paper while displayed on an associated display.

As shown, a slidable arm 2 is adapted to slide vertically in the Y-direction across a sheet of white paper 1. An inputting tool holder 3 is slidably fixed to the arm 2 to move in the X-direction across the sheet of white paper 1. A graphic pattern inputting tool or pen 4 is resiliently held by a support band 5 for preventing the inputting pen from rotating about its longitudinal axis. A graphic pattern outputting tool or pen 6 is fixed to the holder 3 for drawing graphic patterns when the X-Y plotter is used as an output means.

A processing apparatus 7 is responsive to signals from the inputting pen 4, and is shown as comprising a keyboard 7a in a front panel and a display 7b for presenting a graphic pattern which is inputted with the aid of the inputting pen 4. The inputting and outputting pens 4 and 6 are connected to the processing apparatus 7 by signal conveying electric conductors 8.

FIGS. 2 to 5 show four different types of graphic pattern inputting tools.

Figure 2:
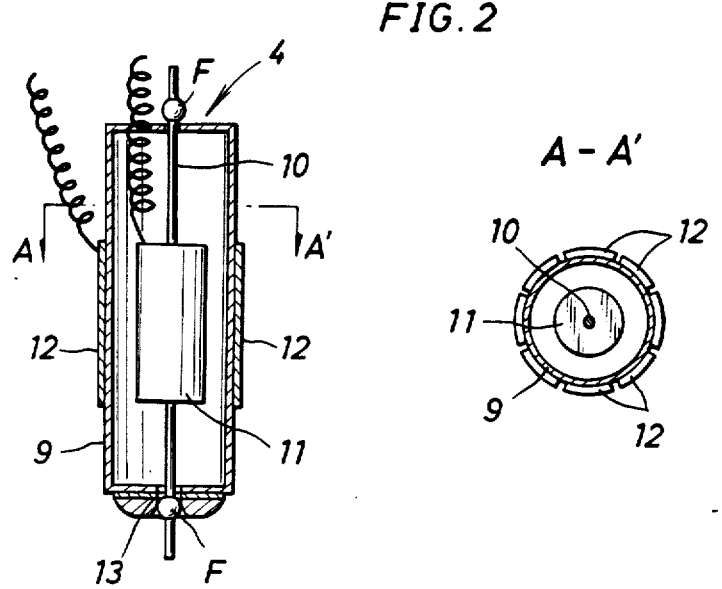
FIG. 2 is a diagrammatic section of a capacitance type inputting tool which may be used in a graphic pattern inputting apparatus according to this invention.

FIG. 2 shows a capacitance type pen as comprising a hollow cylinder housing 9, a center rod 10 resiliently fixed to the cylinder housing 9 and extending therethrough and held in position by ball members F, a hollow cylinder common electrode 11 fixed to the center rod 10 and eight outer electrodes 12 fixed to the outer surface of the cylindrical housing 9 at regular circumferential intervals. In inputting a graphic pattern the inputting pen 4 is moved in a given direction, and the center rod 10 is inclined about its pivot 14, thereby putting the cylindrical common electrode 11 close to one of the outer electrodes to change the capacitance between the common electrode 11 and the selected outer electrode. The strength and direction of a force which is applied to the inputting pen 4 are determined with the aid of an associated oscillator later described. Specifically, the strength of the force is determined in terms of the degree or extent of matching with the resonance frequency of the oscillator whereas the direction of the force is determined in terms of which outer electrode is selected as closest to the common electrode. A pen-down switch 13 is responsive to the push of the pen against the sheet of paper for closing.

Figure 3:
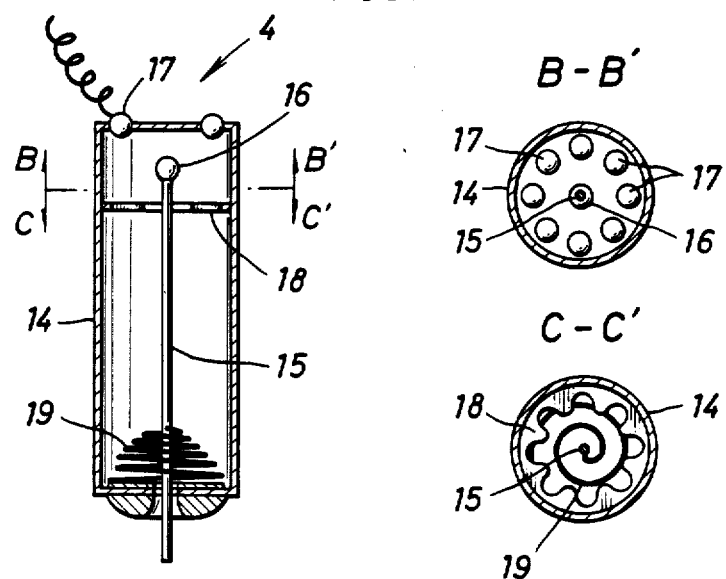
FIG. 3 is a diagrammatic section of a photoelectric type inputting tool which may be used in a graphic pattern inputting apparatus according to this invention.

FIG. 3 shows an example of a photo-electric type graphic pattern inputting pen. As shown, it comprises a hollow cylindrical housing 14, a steel rod 15 extending along the center logitudinal axis of the cylindrical housing and having a lamp 16 fixed to the top end of the center rod, a plurality of photodetectors 17 fixed to the upper circumference of the cylindrical housing at regular intervals, and an annular guide plate 18 fixed to the inner wall of the cylindrical housing. The guide plate 18 is effective to put the center rod 15 in one of the eight discrete directions when the inputting pen 4 is pushed to draw a line in the sheet of paper. A spring means 19 fixed to the bottom of the housing functions to apply a resilient force to the rod 15 at all times for bringing the rod 15 to the original center position.

Figure 4:
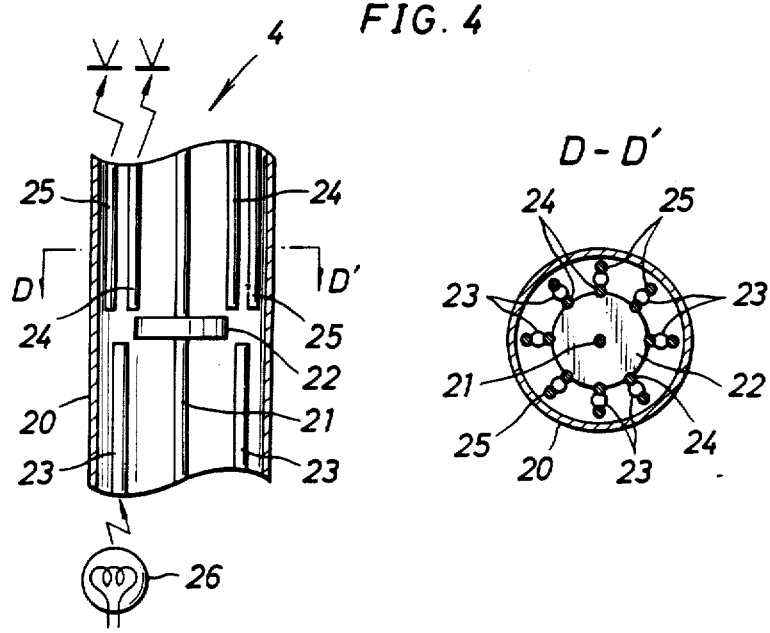
FIG. 4 is another example of inputting tool which may be used in a graphic pattern inputting apparatus according to this invention.

FIG. 4 shows another example of a graphic pattern inputting pen. As shown, it comprises a hollow cylindrical housing 20, a rod 21 extending along the longitudinal center axis of the cylindrical housing 20 and having a masking disk 22 fixed at the middle of the rod, a plurality of light transmitting rods 23 arranged at equal radial distances from the center rod 21 and at regular circumferential intervals below the level of the masking disk 22 and a plurality of light-transmitting rods 24 and 25 at different radial distances from the center rod 21 and at regular circumferential intervals above the level of the masking disk 22. A beam of light from a light source 26 travels the lower light-transmitting rods 23 and then the upper light-transmitting rods 24 and 25 when the masking disk 22 remains at the center. In inputting a graphic pattern with the inputting pen, the center rod 21 is pushed against a sheet of paper and is moved to follow a desired graphic pattern. Then, the masking disk 22 is brought close to the cylindrical wall. As a result the beam of light travelling the lower light-transmitting rods 23 is prevented from travelling to some of the upper light transmitting rods 24. Further increase of the pen pressure brings the masking disk 22 still close to the inner wall of the hollow cylindrical housing to prevent the beam of light from falling in corresponding number of upper light-transmitting rods 25. Photodiodes (not shown) are used to detect the light from upper light-transmitting rods which remain unmasked, thereby determining the pen pressure and the instantaneous drawing direction.

Figure 5:
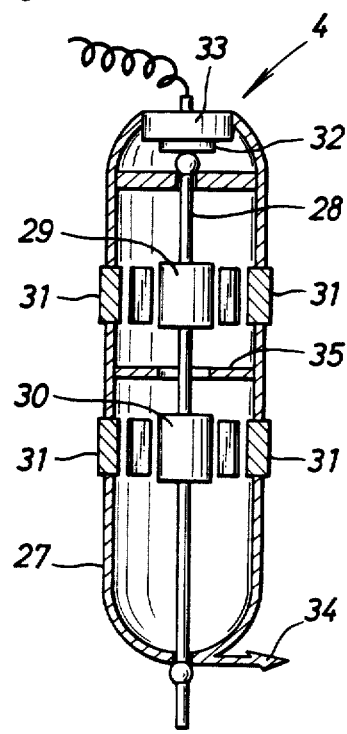
FIG. 5 is still another example of inputting tool which may be used in a graphic pattern inputting apparatus according to this invention.

FIG. 5 shows a graphic pattern inputting pen capable of detecting the pen pressure and the instantaneous drawing direction. As shown, it comprises a hollow cylindrical housing 27, a steel rod 28 extending along the center axis and having two magnet elements 29 and 30 spaced longitudinally from each other and fixed to the rod, and a plurality of magnet-access responsive switches fixed to the inner wall of the hollow cylindrical housing 27 in the opposing relation with the magnet elements 29 and 30.

The inputting pen is responsive to the application of a relatively weak force for bringing one of the magnet elements 29 and 30 close enough to actuate the opposing switch 31, thereby causing an associated circuit to generate a signal representing the application of the weak force to the inputting pen. Likewise the inputting pen is responsive to the application of a relatively strong force for bringing both magnet elements close enought to actuate the opposing switches 31, thereby informing of the application of the relatively strong force to the inputting pen.

The inputting pen also comprises a pen-down switch 32 and a variable resistor 33 both fixed to the ceiling of the hollow housing 27. The pen-down switch 32 is responsive to the push of the pen against a sheet of paper for closing, and the variable resistor 33 is responsive to the rotation of the cylindrical housing for rotating the coordinate system as much angle as desired. An arrow pointer 34 is adapted to indicate the direction in which the X-axis of a new coordinate system is laid after the rotation of the cylindrical housing 27. A guide plate 35 similar to the guide plate 18 of the pen in FIG. 3 is provided to the inner wall of the hollow housing 27.

Thus, the inputting pen permits the detection of the pressure applied thereto both in strength and direction, the determination of the angle of rotation of the coordinate system, and the dispatch of instructions for bringing an associated outputting pen in use.

Figure 6:
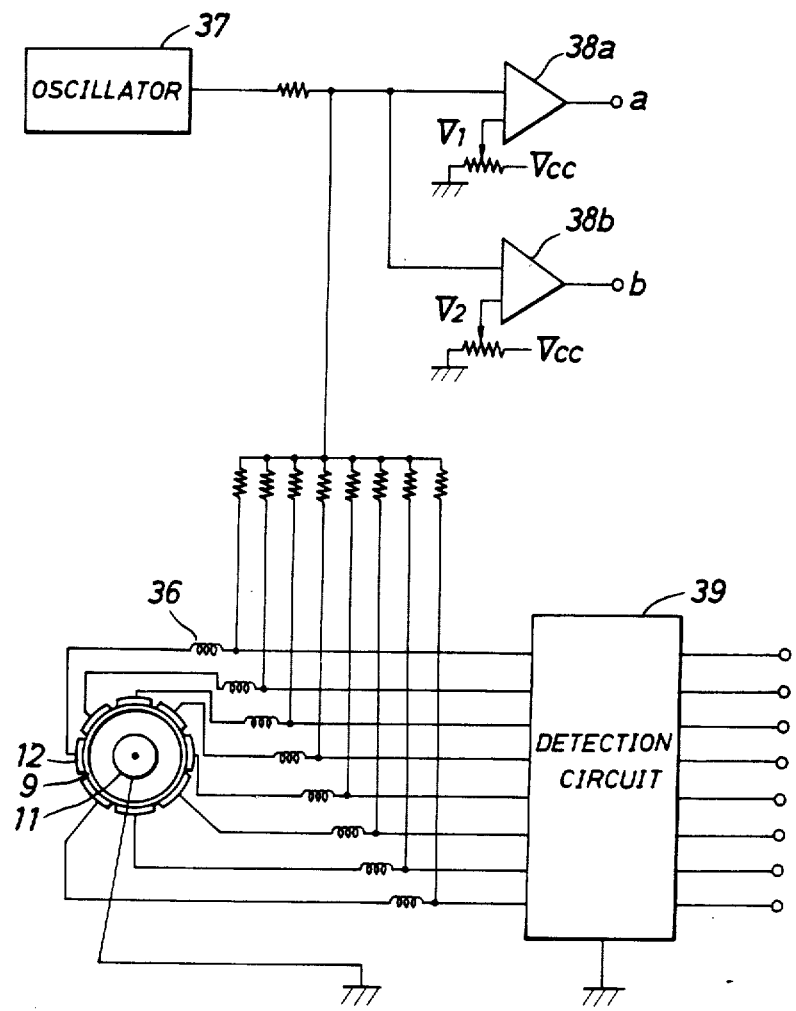
FIG. 6 is a wiring diagram of an electric circuit associated with a capacitance type inputting tool of FIG. 2.

FIG. 6 shows a wiring diagram of a pen-pushing force detector circuit which is adapted to output digital signals representing the strength and direction of a force applied to an inputting pen of the capacitance type as shown in FIG. 2.

Eight inductances 36 are connected each to corresponding one of eight outer electrodes 12 fixed to the outer circumference of the pen housing 9, thereby constituting eight resonant components each comprising one inductance 36 and one capacitor made up by the sole inner electrode 11 and one outer electrode 12. An oscillator 37 has frequency around the resonant frequency of the resonant components. Comparator 38$a$ and 38$b$ have different reference voltages $V_1$ and $V_2$ applied thereto ($V_1 < V_2$), and these comparators 38$a$ and 38$b$ are used to make a decision as to whether a force applied to the inputting pen is strong or weak. A detector circuit 39 is responsive to the direction in which the force is applied to the inputting pen for causing an output signal at high level (herein after abbreviated to "H" signal) to appear at one output terminal selected among a plurality of output terminals of the detector circuit 39, thereby indicating the direction of applied force in terms of terminal numbers. Specifically, the sole inner electrode 11 gets closer to one outer electrode than the other outer electrodes as a result of syplication of the force to the inputting pen, and the capacitance made up by the sole inner electrode 11 and the closest outer electrode increases to the extent that the resonant circuit made up by the capacitance and an associated inductance 36 is brought to tune with the frequency of the oscillator 37, thereby causing an "H" signal to appear at one of the output terminals. The output signal from the resonant circuit is applied to the comparators 38a and 38b, and then the comparator 38a outputs an "H" signal if the applied force is small in strength. Otherwise, the comparators 38a and 38b output an "H" signal if the applied force is strong.

Thus, the applied force detector circuit detects the strength and direction of applied force in the form of digital signal.

Figure 7:
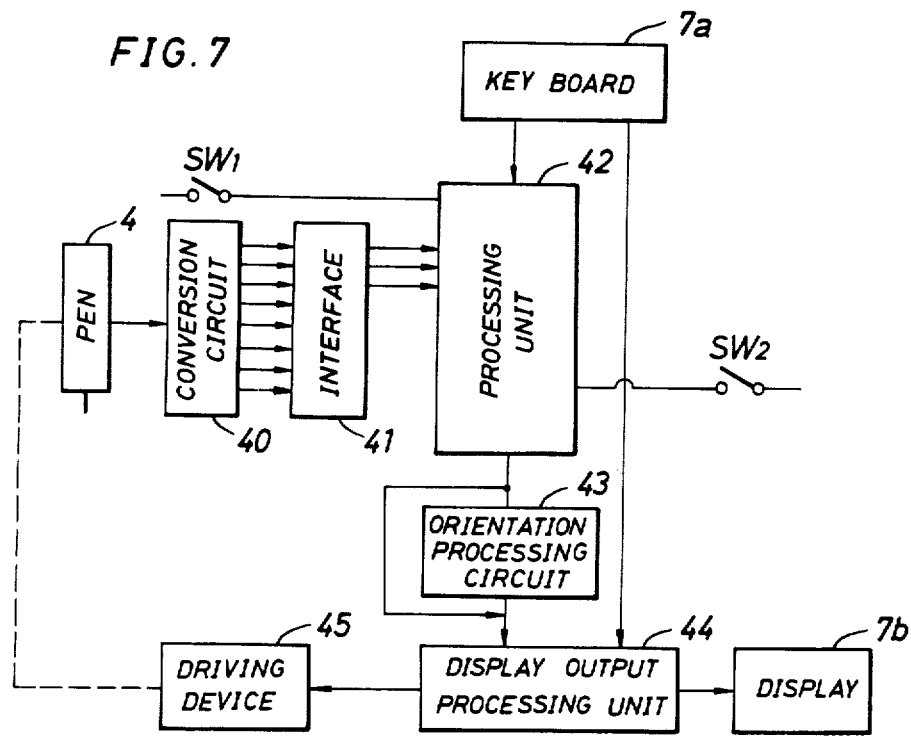
FIG. 7 is a block diagram of a graphic pattern inputting apparatus according to this invention.

FIG. 7 shows a block diagram of graphic pattern inputting apparatus. In FIG. 7 the same parts as appear in FIG. 1 are indicated by the same reference numerals as used in FIG. 1.

An analogue-to-digital converter 40 functions to convert an analogue output signal from a graphic pattern inputting pen 4 to a corresponding digital signal. If a capacitance type inputting pen is used, an electric circuit as shown in FIG. 6 may be used as a converter for this purpose. An arithmetic processing unit 42 is connected to the analogue-to-digital converter 40 via an interface unit 41. The arithmetic processing unit 42 when loaded with data representing the strength and direction of a force applied to the graphic pattern inputting pen 4, performs comparison and arithmetic operations as required according to the on-and-off condition of different switches provided to the inputting pen. As shown the arithmetic processing unit 42 is connected to a display processing unit 44 directly or via a drawing line incremental extension orientating circuit 43. The display processing unit 44 functions to carry out necessary arithmetic operations to determine the instantaneous coordinate position of the inputting pen 4 in response to the output signals from the arithmetic processing unit 42 or the increment orientating circuit 43.

The graphic pattern inputting pen 4 is driven by a pen driver 45, which may be composed of a driver in a conventional X-Y plotter or X-Y recorder. A switch SW is a pen-down switch provided, for instance, in a graphic pattern inputting pen of FIG. 5 when the inputting pen is put on a sheet of paper, the switch SW, turns "on" to send a "pen down" instructing signal for putting down an associated graphic pattern outputting pen on the sheet of paper. Otherwise, the switch SW$_1$ turns "off" to send a "pen up" instructing signal, thus keeping the outputting pen above the sheet of paper. A switch SW$_2$ is provided in the pen or the keyboard for the purpose of performing the increment orientation in drawing.

The "increment orientation" is described as follows: Assume that a given straight line is drawn, and then incremental extensions are continuously drawn one after another by a graphic pattern inputting pen. Then, such incremental extensions are liable to deviate from the correct direction in which each subsequent increment should extend. Among the directions determined by the positions of a plurality of outer electrodes or light-transmitting rods of the inputting pen, one direction closest to the direction in which the incremental extension is being drawn, is selected as the correct direction and is inputted in a data processing unit, thus assuring the drawing of a straight line by hand in spite of such deviation.

Figure 8:
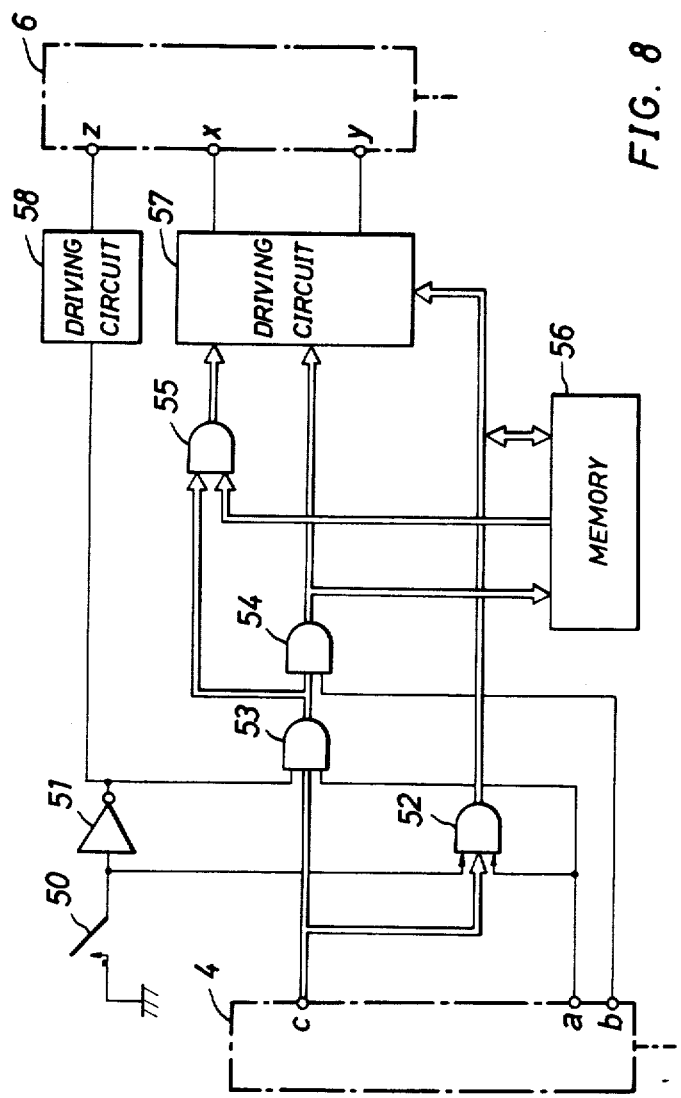
FIG. 8 is a block diagram of an electric circuit for automatically orientating incremental line-extensions in drawing straight lines.

FIG. 8 shows a circuit for automatically selecting and performing increment orientations with reference to the pressure applied to the graphic pattern inputting pen.

When a gentle pressure is applied to the pen 4 (chain line), an "H" signal appears at an output terminal "a". On the contrary, when a strong pressure is applied to the pen, "H" signals appear at output terminals "a" and "b". Also, a signal representing the direction in which the pressure is applied to the inputting pen appears at an output terminal "c". A pen down switch 50 corresponds to the one indicated by SW$_1$ in FIG. 7. When the pen is pushed with a pressure strong enough to turn the switch "on", an inputted graphic pattern is drawn on a display. When the switch remains "off", a bright spot or marker appears to indicate instantaneous positions on the inputted graphic pattern on the display. An inverter 51 functions to output a signal representing the reversal of the on-and-off condition of the pen down switch 50. A memory circuit 56 functions to store the direction in which the force is applied to the inputting pen 4. A drive circuit 57 functions to output signals representing the X and Y components of the drawing direction in which the force is applied to the inputting pen for drawing. Another drive circuit 58 is responsive to the "open" or "close" condition of the pen down switch 50 for putting a graphic pattern outputting pen on the sheet of paper. With the aid of these drive circuits 57 and 58, a desired graphic pattern is drawn in the sheet of white paper while a bright spot is moved to draw the same graphic pattern on the display.

In operation for displaying a desired graphic pattern on the display the graphic pattern inputting pen 4 is put on the sheet of paper with a force strong enough to turn the pen down switch 50 "on". Then, the AND gate 52 is closed, but the AND gates 53 and 54 are open, thereby allowing the memory circuit 56 to store a signal representing the drawing direction in which the pressure is applied to the inputting pen, and at the same time applying the same signal to the drive circuit 57. On the other hand if the previous drawing direction already stored in the memory circuit 56 is in agreement with the present drawing direction, the AND gate 55 opens to direct the drawing direction signal to the drive circuit 57. The AND gate 55 may be designed to open when the discrepancy in direction is within ±90 degrees. Then, even if hand-drawing is somewhat unsteady, a steady drawing appears on the display because the drive circuit 57 outputs X-Y coordinate signals to move the bright spot on the display only at the time of agreement in direction. Thus, the "increment orientation" results. In contrast, in operation for plotting a desired graphic pattern with the bright spot on the display, the inputting pen 4 is not pushed with a force strong enough to turn the pen-down switch 50 "on", and then the pen-down switch 50 remains "off", thereby causing only the AND gate 52 to open. A drawing direction signal is directed to the drive circuit 57. The signal representing the direction of the applied force, however, is not stored in the memory circuit 56, thus disabling the function of increment orientation.

Figure 9:
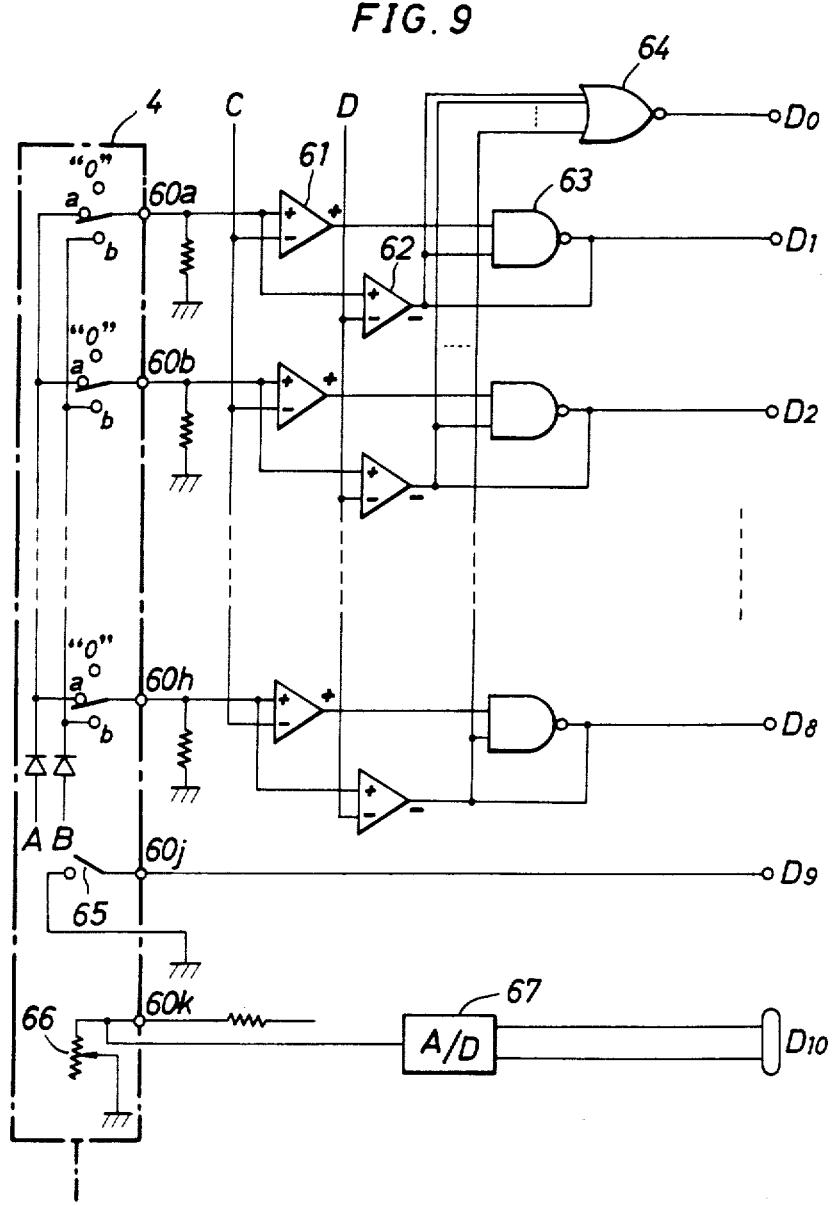
FIG. 9 is a wiring diagram of a circuit for processing electric signals representing an inputting tool pressure from an inputting tool.

A circuit shown in FIG. 9 is designed for detecting the direction in which a force is applied to a graphic pattern inputting pen, making a decision as to whether the force is strong or weak, making a decision as to whether an increment orientation is effected or not, and determining the amount of angle over which the coordinate system is rotated.

A graphic pattern inputting pen 4 is equipped with eight output terminals 60a, 60b, ... 60h connected to the eight outer electrodes for detecting the direction and strength of the applied force, an output terminal 60j for outputting a pen-up signal for pulling up a graphic pattern outputting pen above a sheet of paper or for outputting a pen-down signal for putting the outputting pen on the sheet of paper; and an output terminal 60k for outputting a signal representing the angle of rotation of the coordinate system. The output terminals 60a, 60b, ... 60h are connected each to an associated movable contact, which is adapted to be brought in contact with: a stationary contact "a" when a relatively weak force is applied to the inputting pen, a stationary contact "b" when a relatively strong force is applied to the inputting pen, and a stationary contact "O" when no force is applied to the inputting pen. The stationary contacts "a" are connected to a common conductor "A" which is held, for instance, at 2.5 volts, and the stationary contacts "b" are connected to a common conductor "B" which is held, for instance, at 5.0 volts. Among the output terminals 60a, 60b, ... 60h the one which happens to be in coincedence with the direction of the applied force is selected so that an output signal of 5 volts for the strong force or an output signal of 2.5 volts for the weak force appear at the so selected terminal. The other common conductors "C" and "D" are held at 2.0 and 4.0 volts respectively. Each of the output terminals 60a, 60b, ... 60h is connected to two comparators, which is followed by one NAND gate. Taking an example of the output terminal 60a, when no force is applied to the inputting pen 4 an output signal at a low level (hereinafter abbriviated to "L" signal) appears at the output terminal of the comparator 61, and then the NAND gate 63 is closed. Then, an "H" signal appears at the output terminal $D_1$. When a relatively weak force is applied to the inputting pen 4, an "H" signal appears at the output terminal of each of the comparators 61 and 62, and the NAND gate 63 is opened so that an "L" signal appears at the output terminal $D_1$. On the contrary, when a relatively strong force is applied to the inputting pen 4, an "H" signal appears at the output terminal of the comparator 61, and an "L" signal appears at the output terminal of the comparator 62. Then an "L" signal appears at the output terminal $D_1$. On the other hand, however, an "H" signal appears at the output terminal $D_0$ of the NOR gate 64, thereby indicating the application of the strong force to the inputting pen 4.

If the graphic pattern outputting pen 6 is desired to put on a sheet of paper, a pen-down switch 65 provided to the graphic pattern inputting pen 4 is turned "on", and then an "L" signal appears at the output terminal $D_9$. In contrast, when the outputting pen is brought up above the sheet of paper, an "H" signal appears at the output terminal $D_9$.

Next, when the variable resistor 66 provided to the inputting pen 4 is rotated to set a given angle of rotation of the coordinate system, a signal representing the angle of rotation appears at the terminal 60k, and the signal is directed to the output terminal $D_{10}$ via an analogue-to-digital converter 67.

Figure 10:
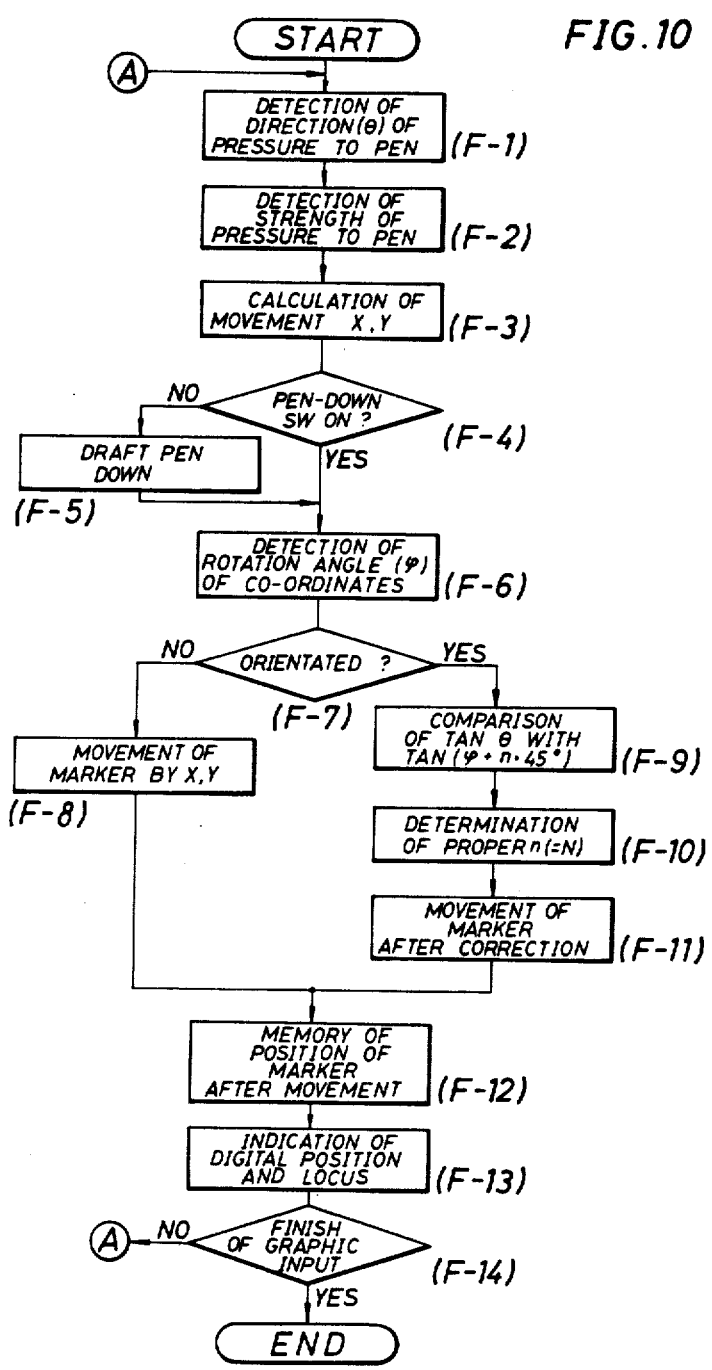
FIG. 10 is a flowchart showing a sequence of operations performed in a graphic pattern inputting apparatus of FIG. 7.

FIG. 10 is a flowchart showing the procedures conducted by the graphic pattern inputting apparatus. The operation of the apparatus is desribed below with reference to FIGS. 1, 7 and 10.

A graphic pattern inputting pen 4 as shown in Figs, 2 to 5 is mounted in the pen holder 3, and the center rod of the inputting pen is pushed against a sheet of paper by hand, and is moved to trace a desired graphic pattern. Then, the inputting pen 4 produces a signal representing the direction "A" of the applied force (F-1) and a signal representing the strength of the applied force (F-2). These signals are converted to corresponding digital signals by the converter 40, and the digital signals are inputted to the arithmetic processing unit 42 via the interface 41 (See FIG. 7). The arithmetic processing unit 42 performs an arithmetic operation (F-3) by which the amounts of shift X and Y in the X and Y directions are determined by a predetermined unit distance $\Delta X$ and $\Delta Y$.

Next, a decision as to whether the graphic pattern outputting pen 6 is pushed down or not is made, judging from the "on" or "off" condition of the pen-down switch 32 of the inputting pen of the type as shown in FIG. 5. When the pen-down switch 32 turns "on", the outputting pen 6 is brought in contact with the sheet of paper (F-5).

The amount of rotation angle of the coordinate system if inputted by an inputting pen of FIG. 5, is detected (F-6).

Figure 11:
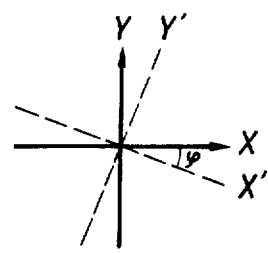
FIG. 11 shows the rotation of associated coordinate system.

If the increment orientation switch provided to the keyboard or the inputting pen turns "on" it's decided that the increment orientation is ready. Otherwise, it is decided that increment orientation is not performed (F-7). In case that no increment orientation is performed, the bright spot moves as long shift distances as calculated by the arithmetic processing unit 42 in the X and Y directions (F-8). When the coordinate system is rotated the angle $\phi$, the shift distances X' and Y' are equal to X cos $\phi$ and Y sin $\phi$ respectively as easily understood with the aid of FIG. 11. In case that the increment orientation is effected, and in case that the coordinate system is rotated the angle $\phi$, the arithmetic processing unit 42 makes a decision as to which one of the eight directions is closest to the direction of the applied force in the new coordinate system X'- Y'. Specifically, the actual decision is made by comparing the tangent of the direction of the applied force $\theta$ with the tangent of the corresponding direction ($\phi$+n·45°) in the new coordinate system (F-9) to find a most appropriate number for "n" (="N") (F-10). Then, the bright spot moves the shift distance represented by X' (=X·cos($\phi$+N·45°)) and Y' (=Y·sin ($\phi$+N·45°)) along the straight line given by tan ($\phi$+N·45°) (F-1). As a matter of course, in place of the software of increment orientation, the automatic increment orientation circuit as shown in FIG. 8 may be used.

Whether an increment orientation may be effected or not, the new position of the bright spot after every shift is stored (F-12), and at the same time the digital representation of position and the trace are displayed on the display 7b (F-13).

The sequential operations above described continue until a signal representing the termination of the graphic pattern inputting operation has been inputted (F-14).

A graphic pattern inputting apparatus according to one embodiment of this invention is described above with reference to the inputting of drawings. The apparatus, however may be equally used for inputting characters. Then, the increment orientation is most useful, permitting the determination of inputted characters with the aid of a relatively simple software because every stroke of the inputted character is free of irregularities, which otherwise would appear, thus making it difficult to compare the inputted character with a corresponding character reference.

Although this invention is described above with reference to a preferred embodiment, it should be understood that this invention should not be limited to such embodiment because a variety of modifications would be possible without departing the spirit of this invention.

What is claimed is:

1. A graphic pattern inputting apparatus comprising:
   manually actuable inputting means mounted for movement parallel to a selected plane for producing sensor signals representative of the direction and magnitude of a manual force, parallel to the plane, applied to said inputting means;
   drive means connected to said inputting means and responsive to control signals for moving said inputting means parallel to the selected plane; and
   processing means connected between said inputting means and said drive means for performing arithmetic operations on said sensor signals for producing control signals which are a function of said sensor signals, and for supplying said control signals to said drive means.

2. Apparatus according to claim 1 wherein said inputting means comprises a capacitance type graphic pattern inputting pen comprising a center rod, a common electrode fixed to the center rod, and a plurality of outer electrodes around said common electrode at regular intervals, thereby allowing said common electrode to get close to one of said plurality of outer electrodes in response to the application of a force to said center rod so that the capacitance made up by said common electrode and said one outer electrode varies accordingly.

3. Apparatus according to claim 1 wherein said inputting means comprises a photoelectric type graphic pattern inputting pen comprising a center rod, a light radiating element fixed to the top end of said center rod, and a plurality of light receiving elements around said light radiating element at regular intervals, thereby causing an increase of the electric output from one of said plurality of light receiving elements in response to the application of a force to said center rod, said one light receiving element being situated in the direction in which said force is applied to said center rod.

4. Apparatus according to claim 1 wherein said inputting means comprises a center rod, a masking plate fixed to said rod, a plurality of first light transmitting rods at one side of said masking plate, and a plurality of second light transmitting rods at the other side of said masking plate, said center rod being movable, in response to a manual force applied to said inputting means, for causing said masking plate to be interposed, and to mask light transmission, between those first and second light transmitting rods which are situated in the direction of the manual force.

5. A graphic pattern inputting apparatus according to claim 1 further comprising graphic pattern display means, and wherein said inputting means has switching means for selectively actuating said graphic pattern display means for displaying a representation of the movement of said inputting means.

6. A graphic pattern inputting apparatus according to claim 1 further comprising a graphic pattern outputting means.

7. Apparatus as defined in claim 1 wherein said processing means are selectively operable in an increment orientation mode for permitting said drive means to move said inputting means in only a selected number of predetermined directions, and for then supplying control signals which cause said drive means to move said inputting means in that one of the predetermined directions which is closest to the direction of the manual force being applied to said inputting means.

8. Apparatus as defined in claim 7 wherein said processing means are caused to operate in the increment orientation mode in response to a sensor signal indicative that the magnitude of the manual force applied to said inputting means exceeds a first selected value.

9. Apparatus as defined in claim 1 wherein said processing means produce control signals causing said drive means to move said inputting means at a selected high speed in response to a sensor signal indicative that the magnitude of the manual force applied to said inputting means exceeds a first selected value.

10. Apparatus as defined in claim 1 further comprising display means connected to produce a graphic pattern display as a function of signals supplied by said processing means and operable in either one of two display modes under control of a mode signal produced by said processing means as a function of the magnitude of manual force applied to said inputting means.

11. Apparatus as defined in claim 1 wherein: said inputting means produce sensor signals representative of direction relative to a two-dimensional Cartesian coordinate system having a selected orientation relative to said inputting means; said apparatus further comprises coordinate system rotating means for rotating the coordinate system parallel to the selected plane; and said processing means are connected to said coordinate system rotating means for performing an arithmetic operation to produce indications of the distance and direction of movement of said inputting means relative to the present orientation of the coordinate system.

12. Apparatus as defined in claim 11 wherein said coordinate system rotating means forms a unit with said inputting means.

13. Apparatus as defined in claim 11 wherein said coordinate system rotating means comprise a rotary variable resistor and an angle of rotation indicator mounted for rotation with said resistor.

14. Apparatus according to claim 1 further comprising display means switchable into an operative condition for producing a display, and said inputting means comprises switching means electrically coupled to said display means and switchable to place said display means in its operative condition.

15. Apparatus as defined in claim 1 further comprising graphic pattern outputting means mounted for movement with said inputting means.

* * * * *